United States Patent
Allen et al.

(10) Patent No.: US 10,664,763 B2
(45) Date of Patent: *May 26, 2020

(54) ADJUSTING FACT-BASED ANSWERS TO CONSIDER OUTCOMES

(71) Applicant: International Business Machines Corporation, Armonk, NY (US)

(72) Inventors: Corville O. Allen, Morrisville, NC (US); Albert A. Chung, Cary, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 466 days.

This patent is subject to a terminal disclaimer.

(21) Appl. No.: 15/050,726

(22) Filed: Feb. 23, 2016

(65) Prior Publication Data
US 2016/0171392 A1 Jun. 16, 2016

Related U.S. Application Data

(63) Continuation of application No. 14/547,367, filed on Nov. 19, 2014.

(51) Int. Cl.
*G06F 16/332* (2019.01)
*G06F 16/9032* (2019.01)
(Continued)

(52) U.S. Cl.
CPC ......... *G06N 20/00* (2019.01); *G06F 16/2322* (2019.01); *G06F 16/3329* (2019.01);
(Continued)

(58) Field of Classification Search
CPC ............. G06F 16/3329; G06F 16/3344; G06F 16/2455; G06F 16/24575; G06F 16/3334;
(Continued)

(56) References Cited

U.S. PATENT DOCUMENTS 6,393,423 B1  5/2002 Goedken
7,266,535 B1  9/2007 Nelken et al.
(Continued)

FOREIGN PATENT DOCUMENTS

CN  103544219 A  1/2014

OTHER PUBLICATIONS

Joanna Stern; "Apple's Siri Can Be The First Call for Users Thinking of Suicide"; https://abcnews.go.com/Technology/apples-siri-now-prevent-suicides/story?id=19438495; Jun. 19, 2013 (Year: 2013).*

(Continued)

*Primary Examiner* — Dennis Truong
(74) *Attorney, Agent, or Firm* — Terrile, Cannatti & Chambers, LLP; Stephen A. Terrile (57) ABSTRACT

A method, system and computer-usable medium are disclosed for adjusting fact-based answers provided by a question/answer (QA) system. A user submits a question to the QA system, where it is categorized into a question type. The QA system then processes the question to generate an answer. The QA system then generates an answer adjustment if it is determined that the question type and answer meet a predicted undesirable outcome. The answer adjustment may include a warning, a disclaimer, a recommendation, an alternative fact-based answer, a referral to an assistance service, or any combination thereof.

6 Claims, 4 Drawing Sheets

(51) Int. Cl.
*G06F 16/33* (2019.01)
*G06F 16/23* (2019.01)
*G06F 16/951* (2019.01)
*G06N 20/00* (2019.01)
*G06N 5/04* (2006.01)
*G10L 15/18* (2013.01)
*G10L 25/63* (2013.01)
*G06N 5/02* (2006.01)

(52) U.S. Cl.
CPC .... *G06F 16/3331* (2019.01); *G06F 16/90332* (2019.01); *G06F 16/951* (2019.01); *G06N 5/04* (2013.01); *G06F 16/3334* (2019.01); *G06F 16/3344* (2019.01); *G06N 5/02* (2013.01); *G10L 15/1822* (2013.01); *G10L 25/63* (2013.01)

(58) Field of Classification Search
CPC .. G06F 16/90332; G06Q 50/265; G06N 5/02; G06N 20/00; G10L 15/1815; G10L 15/1822; G10L 15/183; G10L 25/63
USPC .................. 707/722, 738, 748; 706/47, 52; 434/322; 704/1, 9
See application file for complete search history.

(56) References Cited

U.S. PATENT DOCUMENTS

| | | | |
|---|---|---|---|
| 7,287,041 B2 | 10/2007 | Barnes-Leon et al. | |
| 7,409,335 B1 | 8/2008 | Horvitz et al. | |
| 7,454,393 B2 | 11/2008 | Horvitz et al. | |
| 7,725,334 B2 | 5/2010 | Wahlbin et al. | |
| 7,725,565 B2* | 5/2010 | Li | G06Q 10/067 709/219 |
| 7,949,589 B2 | 5/2011 | Halpin | |
| 7,958,066 B2 | 6/2011 | Pinckney et al. | |
| 8,281,374 B2 | 10/2012 | Carter | |
| 8,285,636 B2 | 10/2012 | Curry et al. | |
| 8,593,274 B2 | 11/2013 | Gancarcik et al. | |
| 8,627,221 B2 | 1/2014 | Plummer et al. | |
| 8,707,441 B1* | 4/2014 | Cidambi | H04L 63/145 726/25 |
| 8,930,178 B2* | 1/2015 | Pestian | G06F 17/2785 704/9 |
| 8,983,996 B2 | 3/2015 | Lai et al. | |
| 9,336,285 B2 | 5/2016 | Vidra | |
| 9,400,841 B2* | 7/2016 | Eggebraaten | G06F 17/3053 |
| 2002/0016070 A1 | 2/2002 | Friese | |
| 2003/0009385 A1 | 1/2003 | Tucciarone et al. | |
| 2003/0177032 A1 | 9/2003 | Bonissone et al. | |
| 2004/0122846 A1 | 6/2004 | Chess et al. | |
| 2004/0199489 A1 | 10/2004 | Barnes-Leon et al. | |
| 2005/0076003 A1* | 4/2005 | DuBose | G06F 16/9535 |
| 2006/0010217 A1 | 1/2006 | Sood | |
| 2006/0115802 A1* | 6/2006 | Reynolds | G09B 5/00 434/236 |
| 2007/0016563 A1 | 1/2007 | Omoigui | |
| 2007/0050191 A1 | 3/2007 | Weider et al. | |
| 2007/0067293 A1 | 3/2007 | Yu | |
| 2007/0124263 A1 | 5/2007 | Katariya et al. | |
| 2007/0198450 A1* | 8/2007 | Khalsa | G06Q 10/06 706/47 |
| 2007/0203863 A1 | 8/2007 | Gupta et al. | |
| 2007/0219863 A1* | 9/2007 | Park | G06Q 10/10 705/14.11 |
| 2008/0010058 A1 | 1/2008 | Weng et al. | |
| 2008/0276159 A1 | 11/2008 | Narayanaswami et al. | |
| 2008/0318197 A1 | 12/2008 | Dion | |
| 2009/0192687 A1 | 7/2009 | Zagorski | |
| 2009/0222437 A1 | 9/2009 | Niu et al. | |
| 2009/0287678 A1 | 11/2009 | Brown et al. | |
| 2009/0292687 A1 | 11/2009 | Fan et al. | |
| 2009/0300586 A1 | 12/2009 | Bernardini et al. | |
| 2009/0327809 A1 | 12/2009 | Joy et al. | |
| 2010/0031234 A1 | 2/2010 | Chaar et al. | |
| 2010/0070554 A1* | 3/2010 | Richardson | G06Q 10/06 709/202 |
| 2010/0153156 A1 | 6/2010 | Guinta et al. | |
| 2010/0185566 A1* | 7/2010 | Schott | G06N 5/043 706/10 |
| 2011/0173146 A1* | 7/2011 | Hnatio | G06Q 10/06 706/14 |
| 2011/0306028 A1* | 12/2011 | Galimore | G06Q 10/063112 434/322 |
| 2011/0314102 A1 | 12/2011 | Teramoto et al. | |
| 2012/0016678 A1* | 1/2012 | Gruber | G10L 15/22 704/275 |
| 2012/0041849 A1 | 2/2012 | Blumenthal et al. | |
| 2012/0078837 A1* | 3/2012 | Bagchi | A61B 5/00 706/52 |
| 2012/0124071 A1 | 5/2012 | Gebhard et al. | |
| 2012/0164991 A1 | 6/2012 | Zhu et al. | |
| 2012/0262296 A1* | 10/2012 | Bezar | G10L 17/26 340/573.1 |
| 2012/0296743 A1 | 11/2012 | Velipasaoglu | |
| 2013/0144605 A1 | 6/2013 | Brager et al. | |
| 2013/0191680 A1 | 7/2013 | Freund | |
| 2013/0246129 A1 | 9/2013 | Chandrasekaran et al. | |
| 2013/0268519 A1 | 10/2013 | Cucerzan et al. | |
| 2013/0304758 A1* | 11/2013 | Gruber | G06F 16/9535 707/769 |
| 2014/0032470 A1 | 1/2014 | McCarthy et al. | |
| 2014/0172879 A1* | 6/2014 | Dubbels | G06F 16/3329 707/748 |
| 2014/0172880 A1 | 6/2014 | Clark et al. | |
| 2014/0172883 A1 | 6/2014 | Clark et al. | |
| 2014/0195532 A1 | 7/2014 | Dheap et al. | |
| 2014/0214820 A1 | 7/2014 | ODonnell | |
| 2014/0297268 A1 | 10/2014 | Govrin et al. | |
| 2014/0316768 A1* | 10/2014 | Khandekar | G06F 16/3329 704/9 |
| 2015/0032724 A1 | 1/2015 | Thirugnanasundaram et al. | |
| 2015/0052092 A1* | 2/2015 | Tang | G06N 99/002 706/16 |
| 2015/0056595 A1* | 2/2015 | Gopalakrishna | G09B 23/28 434/322 |
| 2015/0127598 A1 | 5/2015 | Pinckney et al. | |
| 2015/0169395 A1* | 6/2015 | Giffels | G06F 11/0769 714/57 |
| 2015/0317383 A1* | 11/2015 | Alkov | H04L 51/32 707/738 |
| 2015/0347900 A1* | 12/2015 | Bell | G06N 5/02 706/11 |
| 2015/0356142 A1 | 12/2015 | Proux | |
| 2016/0117485 A1 | 4/2016 | Allen et al. | |
| 2016/0132773 A1* | 5/2016 | Chandrasekaran | G06N 5/04 706/11 |
| 2016/0134961 A1 | 5/2016 | Shaffer et al. | |
| 2016/0140216 A1 | 5/2016 | Allen et al. | |
| 2016/0154892 A1 | 6/2016 | Carrier et al. | |

OTHER PUBLICATIONS

List of IBM Patents or Applications Treated as Related.
Harabagiu et al., "Intentions, Implicatures and Processing of Complex Questions," HLT-NAACL Workshop on Pragmatics of Question Answering, 2004.
Dan Istrate et al., "Embedded Implementation of Distress Situation Identification through Sound Analysis," The Journal on Information Technology in Healthcare 6, pp. 204-211, 2008.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.
Yuan et al., "Watson and Healthcare," IBM developerWorks, 2011.

(56) References Cited

OTHER PUBLICATIONS

R. High, "The Era of Cognitive Systems: An Inside Look at IBM Watson and How it Works," IBM Redbooks, 2012.

* cited by examiner

ADJUSTING FACT-BASED ANSWERS TO CONSIDER OUTCOMES

BACKGROUND OF THE INVENTION

Field of the Invention

The present invention relates in general to the field of computers and similar technologies, and in particular to software utilized in this field. Still more particularly, it relates to a method, system and computer-usable medium for adjusting fact-based answers provided by a question/answer (QA) system.

Description of the Related Art

Cognitive question/answer (QA) systems, such as the IBM Watson™ system available from International Business Machines (IBM™), process questions posed in natural language to determine answers and associated confidence scores based upon various corpora of knowledge. In operation, users submit one or more questions through an application's user interface (UI) or application programming interface (API) to the QA system. In turn, the questions are processed to generate fact-based answers, which are then returned to the user.

At times, these fact-based answers may include information that could be used inappropriately. In particular, the inappropriate use of such information could lead to illegal or unfortunate activities that result in financial, physical or emotional harm to the user or others. For example, a user may ask the question, "Where can I jump from a bridge?" If the user's intent is to know where they might experience bungee-jumping, then the location of such a bridge is appropriate. However, if the user is suicidal, then providing the location of such a bridge could lead to the user's death.

As another example, a user may ask, "Where can I purchase an automatic pistol?" If the user's intent is to purchase a pistol for target practice, then returning information related to a fire arms dealer is appropriate. However, if the user is fixated on perpetrating a school shooting, then provision of the same information may contribute to others suffering possible harm, or even death. Furthermore, the provision of such information could lead to possible legal exposure and litigation for the QA system provider.

SUMMARY OF THE INVENTION

A method, system and computer-usable medium are disclosed for adjusting fact-based answers provided by a question/answer (QA) system. In various embodiments, the QA system is trained to identify a question that might lead to an undesirable outcome. In certain embodiments, the method of training the QA system may include manual, automated or learning approaches.

In various embodiments, a user submits a question to the QA system, where it is categorized into a question type. The QA system then processes the question to generate an answer. The QA system then generates an answer adjustment if it is determined that the question type and answer meet a predicted undesirable outcome. In certain embodiments, the answer adjustment may include a warning, a disclaimer, a recommendation, an alternative fact-based answer, a referral to an assistance service, or any combination thereof. In various embodiments, the answer and the answer adjustment is provided to the user. In certain embodiments, a time-stamped record is generated and retained, which includes the question, the answer, the answer adjustment, and identification information associated with the user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for adjusting fact-based answers provided by a question/answer (QA) system. The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
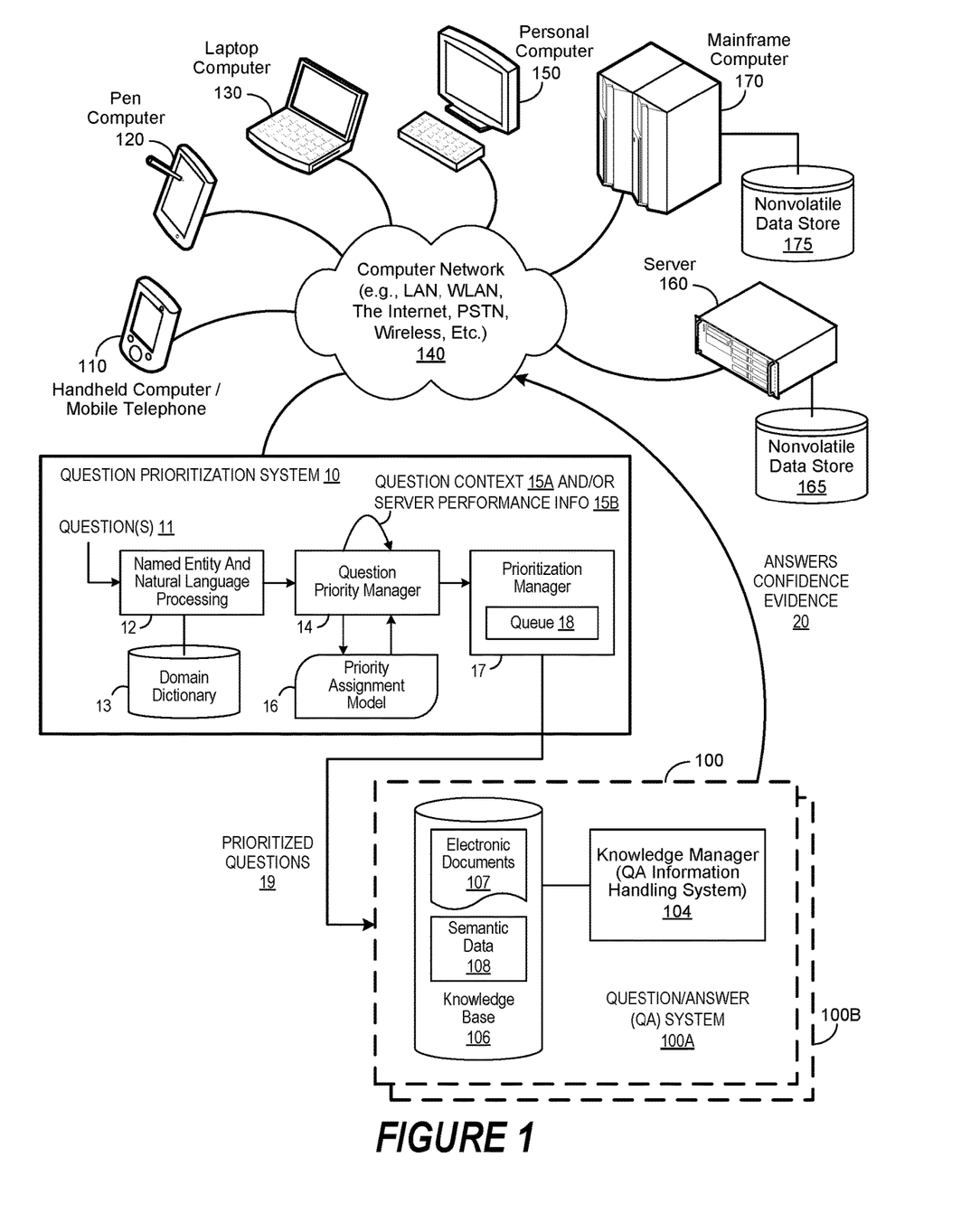
FIG. 1 depicts an exemplary client computer in which the present invention may be implemented.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's Web Sphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are de-queued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores (e.g., server 160 utilizes nonvolatile data store 165, and mainframe computer 170 utilizes nonvolatile data store 175). The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
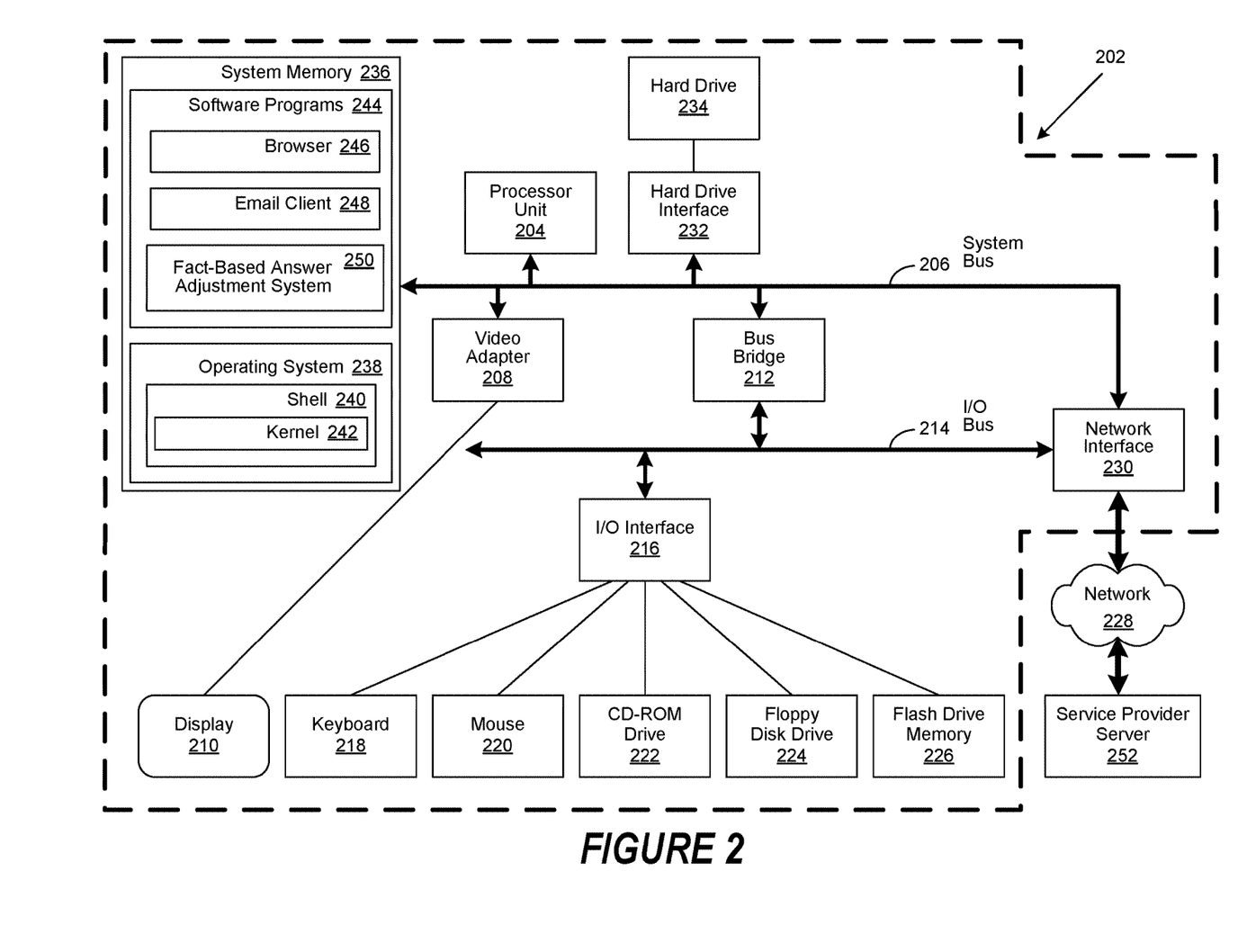
FIG. 2 is a simplified block diagram of an information handling system capable of performing computing operations.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a fact-based answer adjustment system 250. In these and other embodiments, the fact-based answer adjustment system 250 includes code for implementing the processes described hereinbelow. In one embodiment, information processing system 202 is able to download the fact-based answer adjustment system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
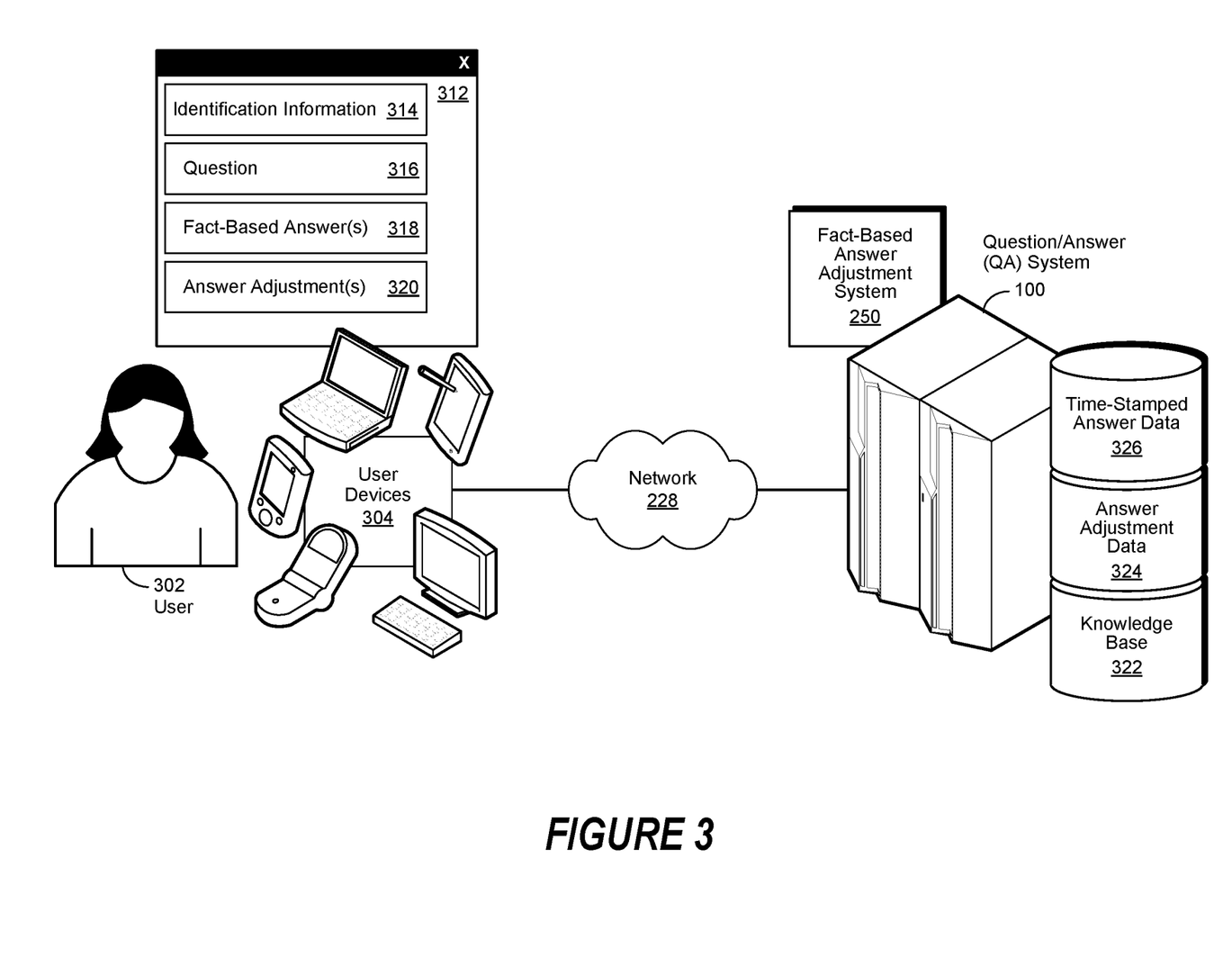
FIG. 3 is a simplified block diagram of a fact-based answer adjustment system used to generate adjustments to fact-based answers.

FIG. 3 is a simplified block diagram of a fact-based answer adjustment system implemented in accordance with an embodiment of the invention to generate adjustments to fact-based answers. In this embodiment, a question/answer (QA) system 100 is implemented to generate candidate fact-based answers 318 in response to receiving a question 316 from a user 302. In various embodiments, the QA system 100 parses the question 316 to extract the major features of the question 316. In turn, these features are then used to formulate queries that are applied to the corpus of data, such as a knowledge base 322. Based upon the application of the queries to the corpus of data, a set of hypotheses, or candidate fact-based answers 318 to the question 316, are generated.

In various embodiments, the QA system 100 is trained to identify questions 316 that may lead to undesirable outcomes. In certain embodiments, the QA system 100 is manually trained. In these embodiments, a user manually flags a set of questions. In turn, training approaches familiar to skilled practitioners of the art are implemented with the QA system 100 such that it learns that questions 316 that have high term or sentence similarity should be flagged. As used herein a term refers to words and compound words whose meaning is dependent upon the context in which they are used. As likewise used herein, term similarity broadly refers to terms that are similar to terms stored in a repository of data, such as the knowledge base 322. Likewise, as used herein, sentence similarity broadly refers to sentences that are similar to sentences stored in a repository of data, such as the knowledge base 322.

In various embodiments, automated keyword training is implemented to automate the training of the QA system 100. In these embodiments, a user creates a list of keywords, and questions containing those keywords and related synonyms, that should be flagged. In certain of these embodiments, the QA system 100 observes a question 316 submitted by a user 302, along with future events associated with the user 302 (e.g., via social media interactions) that are related to the question 316. As an example, two users 302 may ask the same question 316, "Where can I jump off a bridge?" One user 302 posts photographs on a social media site of themselves base-jumping off a bridge, while the other user 302 is mentioned in an obituary that mentions a bridge.

In various embodiments, the QA system 100 maintains a record of questions 316 asked by a user 302 while also ingesting the user's 302 posts to various social media venues. In these embodiments, the time and date of the user's questions 316 are indexed to the time and date of the user's social media postings. In certain embodiments, feature extraction operations are performed to detect various image features within photographs that the user 302 may have posted. To continue the previous example, the feature extraction operations may detect an image of a bridge and an image of a parachute in a photograph posted by the user. As a result, keywords such as "bridge" and "parachute" may be associated with the question 316 as inferred input. To further the example, natural language processing (NLP) of text associated with the posted photograph may also reference the user's 302 desire to base-jump off of a bridge, as shown in the posted photograph.

In various embodiments, keywords extracted from various questions 316 and social media posts associated with the user 302, along with keywords inferred from photographs posted by the user 302, are processed to identify synonym and concept similarities, which are in turn used to generate a keyword relevance score. In certain embodiments, keywords extracted from various questions 316 and social media posts associated with the user 302, along with keywords inferred from photographs posted by the user 302, are processed with their respective time and date stamps to generate a decaying relevance score. As an example, a user 302 makes two social media posts that are associated with a question 316 submitted by the user 302 to the QA system 100. The first post takes place a week after the question 316 was submitted and the second post takes place a year after the question 316 was submitted. In this example, the post made a week after the question 316 was submitted has a higher relevance score than the post made a year after the question 316 was submitted.

To continue the example, a user 302 asks the question 316, "Where can I jump off a bridge?" on day 1. On day 3, the user 302 has posted a photograph of themselves fishing on a bridge. The caption for the photograph is, "A bad day of fishing is better than a good day at work." In combination, the photograph and its associated caption are processed to generate keywords including "bridge," "fishing," and "work." A second photograph is then posted by the user 302 on the same day, showing the user 302 jumping off the bridge to swim. The second photograph is processed, as described in greater detail herein, to generate inferred keywords that include "bridge," "jumping," and "swim." Then, on day 15, a third photograph is posted by the user 302, showing an aerial view of a river with a caption saying, "base jumping off of Royal Gorge Bridge." As before, the third photograph and its associated caption are processed to generate keywords that include "bridge" and "base jumping. Then, on day 140, the user 302 posts a fourth photograph of them and a friend, with a bridge in the background, along with an associated caption saying, "Just hanging out." The photograph and its associated caption are then processed to generate keywords and phrases that include "bridge" and "hanging out."

In this example, the resulting keyword relevance score indicates that bridges are related to "fishing," "base jumping," and "hanging out." Likewise, the resulting decaying relevance score would give a higher association to fishing and jumping. From the foregoing, it would not be assumed that hanging out with friends at bridges is related to jumping off of them since the time intervals between the social media posts are so far apart.

In certain of these embodiments, the QA system 100 uses a fact-based answer adjustment system 250 to process candidate fact-based answers to identify potentially undesirable outcomes or flagged conditions associated with the question 316. The processing analyzes the candidate fact-based answers with reference to potentially undesirable outcome criteria identifying the potentially undesirable outcomes and flagged conditions. As used herein, a potentially undesirable outcome broadly refers to a potentially illegal, risky or harmful result arising from the use of a fact-based answer provided by the QA system 100. For example, misuse of a fact-based answer 318 provided by the QA system 100 may result in the incurrence of financial risk, physical damage, death, pain, or legal liability.

As likewise used herein, flagged conditions broadly refer to potentially undesirable implied or inferred behaviors, activities, events, intents or actions associated with the question 316. Thus flagged conditions broadly refer to behaviors which could lead to a potentially undesirable outcome. For example, the question 316 may contain a reference to base-jumping, which is a risky activity that may result in physical harm, death, legal liability, or a combination thereof. As a result, "base-jumping" may be referenced as a flagged condition in various embodiments by the QA system 100, the fact-based answer adjustment system 250, or both. Skilled practitioners of the art will realize that many such examples are possible and the foregoing is not intended to limit the spirit, scope or intent of the invention.

Accordingly, the QA system 100 evaluates the question 316 in various embodiments to consider not just a candidate fact-based answer 318, but the possible kinds of outcomes associated with the question 316. In these embodiments, fact-based answer adjustments 320 to the fact-based answers 318 are generated by the fact-based answer adjustment system 250 when undesirable outcomes or flagged conditions associated with the question 316 are identified. In certain embodiments, the fact-base answer adjustments 320 may include a warning, a disclaimer, a recommendation, an alternative fact-based answer 318, a referral to an assistance service, or any combination thereof.

As an example, the QA system 100 may receive the question 316, "Where can I jump off of a bridge?" In this example, suicide may be identified as a potentially undesirable outcome, while base jumping and bungee jumping may be identified as flagged conditions. In this example, the fact-based answer adjustments 320 may include a suicide prevention link, a warning about the dangers associated with bungee jumping, a legal disclaimer that base jumping from many bridges may be illegal, or a combination thereof. Those of skill in the art will realize that many such examples are possible and the foregoing is not intended to limit the spirit, scope or intent of the invention.

Referring now to FIG. 3, a user 302 uses a user device 304 to submit a question to the question/answer (QA) system 100. As used herein, a user device 304 refers to an information processing system such as a personal computer, a laptop computer, a tablet computer, a personal digital assistant (PDA), a smart phone, a mobile telephone, or other device that is capable of communicating and processing data. In various embodiments, the user device 304 is used to exchange information between the user 302 and the QA system 100 through the use of a network 228.

In various embodiments, the network 228 may be a public network, such as the Internet, a physical private network, a virtual private network (VPN), or any combination thereof. In certain embodiments, the network 228 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In various embodiments, operations to generate adjustments to fact-based answers generated by a QA system 100 are begun by receiving user identification information 314 associated with a user 302. The type of user identification information 314, and the method by which it is received, is a matter of design choice. As an example, the user identification information 314 may include a user identifier (ID) and password associated with the user 302. As another example, the user identification information 314 may include the Internet Protocol (IP) address of a user device 304 being used by the user 302. In various embodiments, the user identification information 314 is entered by the user 302 into a User Interface (UI) window 312 associated with a user device 304 being used by the user 302.

Once the user identification information has been received, a question generated by the user 302 is then received by the QA system 100 for processing. In various embodiments, the QA system 100 may receive the question as a result of the user 302 entering the question 316 within a UI window 312 of a user device 304 being used by the user 302. In certain embodiments, the QA system 100 may receive the question 316 through an application programming interface (API) associated with a user device 304 used by the user 302. Skilled practitioners of the art will recognize that many such embodiments are possible and the foregoing is not intended to limit the spirit, scope or intent of the invention.

The question 316 received from the user 302 is then processed by the QA system 100 to generate one or more candidate answers, which are in turn processed to identify potentially undesirable outcomes and flagged conditions associated with the question 316. In various embodiments, the QA system 100 uses a fact-based answer adjustment system 250 to process the candidate questions to identify the potentially undesirable outcomes and flagged conditions. If no potentially undesirable outcomes or flagged conditions were identified, then one or more fact-based answers 318 to the question are generated provided to the user 302. Otherwise, one or more fact-based answers 318 to the question 316, and associated fact-based answer adjustments 320, are generated and provided to the user 302. In various embodiments, the associated fact-base answer adjustments 320 may include a warning, a disclaimer, a recommendation, an alternative fact-based answer, a referral to an assistance service, or any combination thereof. In certain embodiments, the fact-based answer adjustments 320 are generated by the fact-based answer adjustment system 250 using a repository of answer adjustment data 324.

In certain embodiments, the one or more fact-based answers 318, and any associated fact-based answer adjustments 320, are provided to the user 302 within a UI window 312 of a user device 304 used by the user 302. Those of skill in the art will recognize that many such embodiments are possible and the foregoing is not intended to limit the spirit, scope or intent of the invention. Once the one or more fact-based answers 318, and any associated fact-based answer adjustments 320, are provided to the user 302, a time-stamped record of everything that was provided to the user 302 in response to receiving the question 316, as well as associated user identification information 314, is generated and retained. In various embodiments, the resulting time-stamped record is stored in a repository of time-stamped answer data 326.

Figure 4:
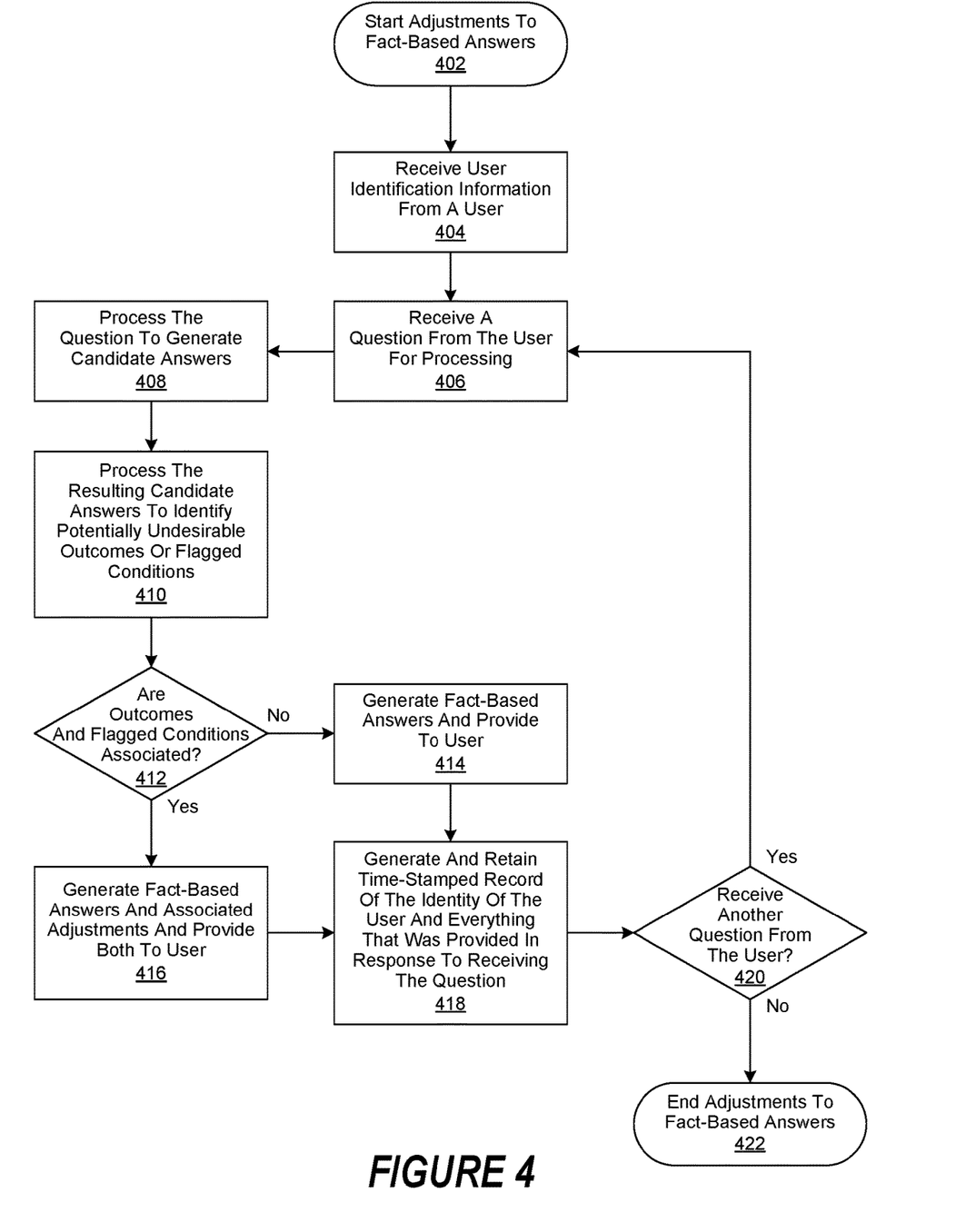
FIG. 4 is a generalized flowchart of the performance of operations to generate adjustments to fact-based answers.

FIG. 4 is a generalized flowchart of operations performed in accordance with an embodiment of the invention to generate adjustments to fact-based answers. In this embodiment, operations to generate adjustments to fact-based answers are begun in step 402, followed by a question/answer (QA) system, described in greater detail herein, receiving user identification information in step 404. The type of user identification information, and the method by which it is received, is a matter of design choice. As an example, the user identification information may include a user identifier (ID) and password associated with the user. As another example, the identification information may include the Internet Protocol (IP) address of a system being used by the user.

Once the user identification information has been received in step 406, a question generated by the user is then received by the QA system for processing in step 406. In various embodiments, the QA system may receive the question as a result of a user entering the question within a user interface (UI) window of a user device. In certain embodiments, the QA system may receive the question through an application programming interface (API) associated with a user device. Skilled practitioners of the art will recognize that many such embodiments are possible and the foregoing is not intended to limit the spirit, scope or intent of the invention.

The question received from the user is then processed by the QA system in step 408 to generate one or more candidate answers, which are in turn processed in step 410 to identify potentially undesirable outcomes and flagged conditions, described in greater detail herein, associated with the question. A determination is then made in step 412 whether any potentially undesirable outcomes or flagged conditions were identified in step 410. If not, then one or more fact-based answers to the question are generated in step 414 and provided to the user. Otherwise, one or more fact-based answers to the question, and associated fact-based answer adjustments, are generated in step 416 and provided to the user. In various embodiments, the associated fact-base answer adjustments may include a warning, a disclaimer, a recommendation, an alternative fact-based answer, a referral to an assistance service, or any combination thereof. Those of skill in the art will recognize that many such embodiments are possible and the foregoing is not intended to limit the spirit, scope or intent of the invention.

Thereafter, or after operations performed in step 414 have been completed, a time-stamped record of everything that was provided to the user in response to receiving the question, as well as associated user identification information, is generated and retained in step 416. A determination is then made in step 420 whether another question is received from the user for processing by the QA system. If so, then the process is continued, proceeding with step 406. Otherwise, operations to generate adjustments to fact-based answers are ended in step 422.

Although the present invention has been described in detail, it should be understood that various changes, substitutions and alterations can be made hereto without departing from the spirit and scope of the invention as defined by the appended claims.

What is claimed is:

1. A computer-implemented method for adjusting answers to a question asked of a question/answer (QA) system, comprising:

receiving a question as user input from a user, the question being received by the QA system, the QA system comprising a knowledge manager and a knowledge base, the QA system being configured to provide QA generation functionality for in response to receipt of user questions, the QA system interacting with a question prioritization system, the question prioritization system comprising a named entity subsystem, the named entity subsystem using natural language processing to analyze a question and extract question topic information contained in the question, the QA system being trained to identify fact-based answers corresponding to potentially undesirable outcomes, the training comprising identifying questions that have a term whose meaning is dependent upon the context in which the term is used and respective fact-based answers to the questions having the term whose meaning is dependent upon the context;

parsing the question to extract features of the question using question topic information contained in the question, the features of the question being used to formulate queries that are applied to a corpus of data, questions that have a high term or sentence similarity to questions that have a term whose meaning is dependent upon the context is used being flagged as likely to lead to the potentially undesirable outcome, the parsing the question comprising performing a feature extraction operation, the feature extraction operation identifying flagged conditions from the question, the flagged conditions referring to an inferred behavior, an activity, an event, an intent or an action associated with the question that could lead to the potentially undesirable outcome;

processing the question to generate a fact-based answer; and generating an answer adjustment when it is determined that the question and the answer correspond to an undesirable outcome criteria, the undesirable outcome criteria identifying an undesirable outcome, the harmful outcome comprising an illegal, risky or harmful result arising from use of the fact-based answer by the user, the answer adjustment providing an alternate fact-based answer, the alternate fact-based answer preventing provision of an answer that would lead to the illegal, risky or harmful result to the user from use of the answer by the user.

2. The method of claim 1, wherein the answer adjustment is at least one member of the set of:
   a warning;
   a disclaimer;
   an alternative answer
   an assistance service;
   a recommendation; and
   a referral to an assistance service.

3. The method of claim 1, wherein the QA system is trained to identify a question that might lead to an undesirable outcome.

4. The method of claim 3, wherein the method of the training is selected from a group consisting of:
   manual;
   automated; and
   learning.

5. The method of claim 1, wherein the answer and the answer adjustment are provided to the user.

6. The method of claim 1, further comprising generating and retaining a time-stamped record comprising:
   the question;
   the answer;
   the answer adjustment; and
   identification information associated with the user.

* * * * *